United States Patent [19]
Carette et al.

[11] 4,305,744
[45] Dec. 15, 1981

[54] METHOD OF MAKING AN ELECTRON MULTIPLIER DEVICE

[75] Inventors: Jean-Denis Carette, Ancienne Lorette; Claude Bouchard, Duberger, both of Canada

[73] Assignee: Universite Laval, Cite Universitaire, Quebec, Canada

[21] Appl. No.: 187,404

[22] Filed: Sep. 15, 1980

Related U.S. Application Data

[62] Division of Ser. No. 954,084, Oct. 24, 1978, abandoned.

[51] Int. Cl.³ ............. C03B 19/00; C03B 32/00; C03C 23/00
[52] U.S. Cl. .................................. 65/32; 65/45; 65/48; 65/137
[58] Field of Search ............ 65/32, 45, 47, 48, 72, 65/137, 156, 157; 427/86, 87, 93, 238

[56] References Cited

U.S. PATENT DOCUMENTS 3,331,670  7/1967  Cole ................................ 65/32
3,911,167 10/1975  Linder ............................. 427/87

*Primary Examiner*—Richard V. Fisher
*Attorney, Agent, or Firm*—Cushman, Darby & Cushman

[57] ABSTRACT

An electron multiplier device formed of the combination of a support made of high temperature-resisting electrically-insulating ceramic material and of a layer of secondary electron emitting semi-conducting glass material fused to the inner wall of the ceramic material and method of making; the multiplier device is further characterized in that the ceramic material and the glass material have substantially the same coefficient of expansion. The device is made by pouring molten semi-conducting glass into at least one channel in a ceramic support having a higher fusion point than that of the glass and the same coefficient of expansion, flowing the glass under pressure through the channel and cooling to leave a semi-conductor wall to the channel.

3 Claims, 5 Drawing Figures

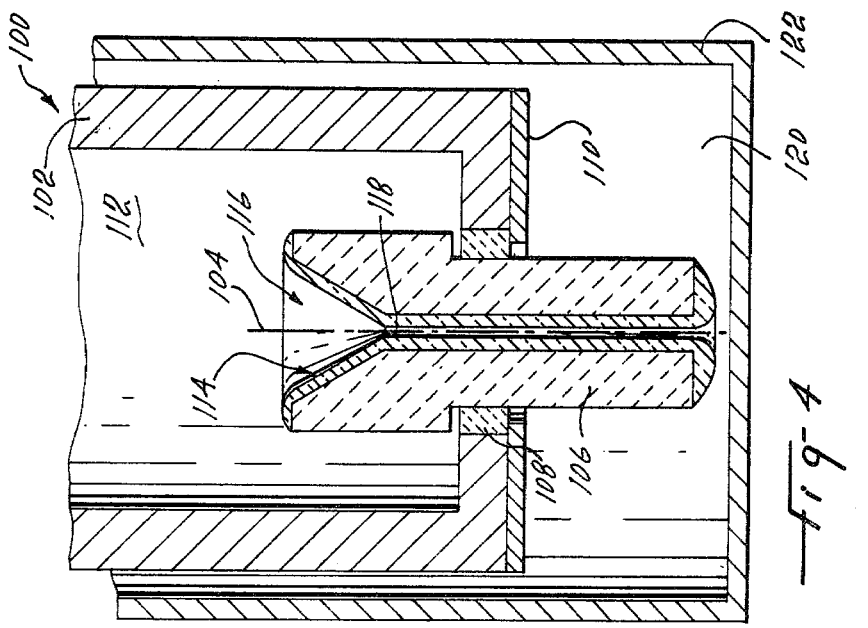
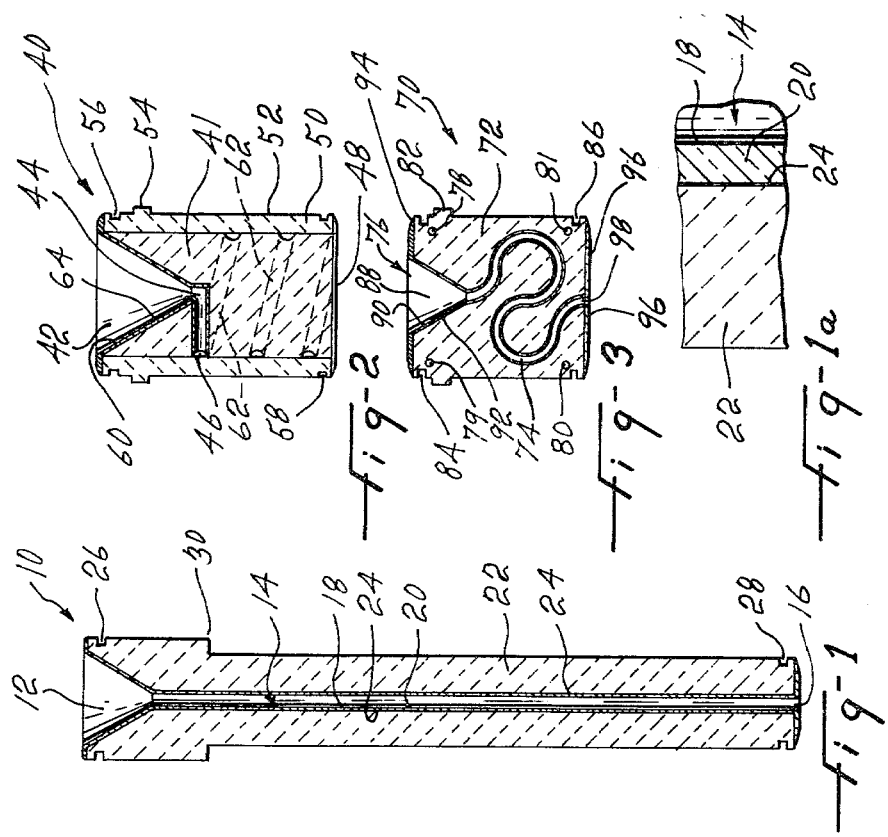

METHOD OF MAKING AN ELECTRON MULTIPLIER DEVICE

This is a division of application Ser. No. 954,084 filed Oct. 24, 1978, now abandoned.

FIELD OF THE INVENTIION

The present invention pertains to an improvement in electron multiplier devices and, more particularly, to such type which comprises an insulating body pierced by a channel of a very small diameter, the inner wall of which is coated with a very thin electrically resistive layer having properties of secondary electron emission.

BACKGROUND OF THE INVENTION

It may be recalled that, with such electron multiplier devices of the type described, an electric field is produced in the channel by establishing a suitable potential difference between the extremities and by causing a beam of primary electrons to penetrate into the channel under difficult angles thereby resulting in a series of secondary electron emissions on the internal wall of the channel. At the output, the number of electrons is greatly increased as compared to the primary beam at the input. An electron multiplier device can be used in the form of a single tube, or a plurality of such tubes can be bundled together.

Typical prior art secondary electron multipliers consist of straight or curved tubes of insulating material, such as glass, coated on its entire inside surface with a conductive coating made of secondary electron emissive material. There exists also another type of secondary electron multiplier using a tube made only of ceramic such as barium titanate or zinc titanate which may be found described in U.S. Pat. No. 3,612,946 issued Oct. 12, 1971 to Toyoda.

While the ceramic type of electron multiplier devices overcome the many disadvantages associated with electron multiplier devices wherein the insulating material used is glass (little resistance to impact the charged particles or mechanical injuries, expensive to mass produce, unstable in operation, etc.), they are, however, limited in construction and in use. Indeed, since the ceramic materials used in these electron multiplier devices have semi-conducting properties, it is practically impossible to maintain a uniform potential gradient inside a curved channel machined or molded in a bulk piece of semi-conducting ceramic. The polarising current in semi-conducting ceramic electron multiplier is distributed inside the whole body of the multiplier this characteristic imposes a limitation on their construction. For such multipliers to operate satisfactorily, the thickness of the ceramic must be constant throughout the length of the multiplier channel. The selection of ceramic to be used is extremely limited and as described in the above mentioned Toyoda patent, the advantages obtained with ceramic is best achieved with a barium titanate or zinc titanate family semi-conducting ceramic material having positive or zero-resistance temperature characteristics. Such ceramic is not one which is easily machinable or moldable with high accuracy thereby limiting the shapes which can be given to an electron multiplier device.

OBJECTS OF THE INVENTION

It is an object of this invention to provide an electron multiplier device which is capable of providing a great variety of shapes or geometrical configurations.

It is another object of the present invention to provide an electron multiplier device which is simple in construction and which is capable of receiving the great precision inherent to machining or molding processes.

It is another object of the present invention to provide an electron multiplier device which is capable of being recycled when its emissive surfaces become exhausted or deteriorated.

STATEMENT OF THE INVENTION

The present invention therefore relates to an electron multiplier device which comprises: in combination, a support made of high temperature-resisting electrically-insulating ceramic material, the support having an internal wall defining a channel therethrough; a layer of secondary electron emitting semi-conducting glass material fused to the internal wall; the ceramic material and the glass material having the same coefficient of expansion.

This invention is therefore concerned with the construction of an electron multiplier device whereby glass material is fused to an insulating ceramic. This realization enables a great variety of ceramic material; for example, a machinable ceramic can be selected which can be worked with conventional steel working equipment. Also, a ceramic can be chosen independently of any constraint imposed by the semi-conductivity and the secondary emission which must be satisfied in the case of a multiplier entirely made of ceramic. However, to achieve this, the coefficient of expansion of the glass material must be matched to that of the ceramic material so that minimum strain be produced on the multiplier formed. The semi-conducting glass is formed from an appropriate mixture of oxides, for example, $SiO_2$, $PbO$, $BaO$, $Bi_2O_3$, which are intimately mixed together and fused in a crucible to 1000° C. The mixture is poured in the channel molded or machined in the ceramic support. The emissive and semi-conducting surfaces in the electron multiplier are obtained by depositing a layer of semi-conducting glass on the internal wall of the channel. The ceramic selected must be capable of support temperatures in the 1000° C. without deformation and this stability permits to the semi-conducting glass to flow easily in the channel. During the flowing process (which may be by gas pressure), the semi-conducting glass adheres to the wall of the channel in the ceramic support by surface tension; when the semi-conducting glass has flown through the channel, the apparatus is cooled down and the gas pressure is removed. This process leaves a semi-conducting layer on the wall of the channel.

The entire mass of glass material may be rendered semi-conducting; in such embodiment, the thickness of the layer should be made constant as much as possible so as to obtain a uniform potential gradient throughout the channel. On the other hand, in a preferred form of the invention, the conduction properties of the layer are stimulated and enhanced by reduction of the metallic oxides contained in the glass which covers the wall of the channel. The reducing agent, for instance hydrogen, is allowed to flow in the channel for a given time and temperature (for example, at 450° C. for about 4 to 6 minutes). This produces a semi-conducting and emissive film on the layer of glass, thus simplifying the construction of the electron multiplier device. Indeed, few machining imprecisions, fissures or loss of material are acceptable in the ceramic without affecting the properties of the finished product. These defects are filled by the glass in fusion and, since the latter is only superficially conducting, they have no effect on the potential gradient inside the multiplier device. The film obtained has a resistance ranging from $10^8$ to $10^{10}$ ohms.

In practice, after long periods of electron bombardment, the emissive surfaces of the multiplier deteriorate irreversibly. For example, exposure to oil vapors from pumping systems can lead to polymer formation at the end of the channel or a pressure accident in a vacuum system can cause destruction by ion bombardment. A treatment which does not depend on the particular surface state reached is thus needed. Rebuilding the semi-conductive layer, which is only 1 $\mu$m thick, is one solution to the problem and the present invention makes it easily realizable. First, the electrical contacts are dissolved with appropriate acid solutions and the reduced layer and foreign materials, if present, are etched in an appropriate solution, for example, a mixture of HF, $HNO_3$, $H_2O$ with ultrasonic agitation. By using less concentrated solutions, one can etch only a small thickness of the glass layer and remove the contaminants. For more serious damage, rebuilding of the semi-conducting layer is done by adding a small quantity of semi-conducting glass through the channel and flowing and reducing in the manner described above. This recycling cannot be done with multipliers of the prior art because of the high temperatures involved in this process which can only be supported by pure silica or ceramic. However, to achieve this recycling feature, the fusion point of the ceramic material must be higher than that of the glass material thereby ensuring that the ceramic material will not be affected during the recycling process.

BRIEF DESCRIPTION OF THE DRAWINGS

FIG. 1 is a longitudinal cross-section of a straight continuous dynode electron multiplier made in accordance with the present invention;

FIG. 1a is an enlarged view of the internal channel showing the soldered ceramic and glass materials;

FIG. 2 is a cross-sectional view showing another embodiment of the present invention;

FIG. 3 is a cross-sectional view showing a further embodiment of the present invention; and FIG. 4 is a schematic illustration of a device for making an electron multiplier in accordance with the present invention.

GENERAL DESCRIPTION OF THE INVENTION

The electron multiplier device according to the present invention is principally characterized by the combination of layer of semi-conducting glass that has the proper composition to possess the same coefficient of expansion as that of the ceramic material which acts as the envelope or supporting frame of the multiplier device. The ceramic material is first machined or molded to provide a channel therethrough. Then, the layer of glass material is formed by flowing the glass material under gas pressure through the channel and cooling.

EMBODIMENTS OF THE INVENTION

Referring to FIG. 1, a straight continuous dynode electron multiplier 10 is shown as being formed of a solid body having a central channel that includes a funnel entrance 12 followed by an elongate straight channel section 14 and an exit section 16. As described above, a semi-conductive and emissive film 18, with a thickness of about 1 $\mu$m for example, is produced on the glass layer 20 intimately soldered to the ceramic support 22; an interdiffusion zone between the two materials is shown at 24. The thickness of the glass layer is about 200 $\mu$m. Two peripheral grooves 26 and 28 are provided at opposite ends of the multiplier to facilitate wire attachments. Electrical contacts between the reduced layer 18 and the wire attachment can be performed with silver paint; however, for ultra-high vacuum applications, vacuum deposited chromium contacts are preferred. Grooves 26 and 28 are molded or machined in the ceramic material and may receive stainless steel wires which are fixed at both ends of the ceramic frame after the chromium vacuum deposition. Shoulder 30 on the outer wall of the body provides a stop for the ceramic frame when gas pressure is applied at entrance 12 during the fabrication process and, also, provides fixation facilities for utilization of the multiplier in other apparatus. Typical dimensions of such an electron multiplier are 1 mm for the inner diameter and 69 mm for the length of the straight section 14.

As mentioned above, an important feature of the present invention is that both the ceramic material and the glass material have substantially the same coefficient of expansion. It has been found that differences in the range up 8% can be allowed between both coefficients of expansion without affecting the composite multiplier device. In one example, for instance, the glass may have a coefficient of expansion of $9.2 \times 10^{-6}/°C$. with an annealing point at about 400° C. From this temperature to room temperature, the expansion of glass is about 3500 ppm. Hence, for a combination of glass and ceramic, 300 ppm can be tolerated, which is about 8%.

Referring to FIG. 2, there is shown another embodiment of the present invention wherein an electron multiplier 40 is formed of an inner cylinder 41 made of ceramic and having a funnel entrance 42 which is machined. A hole 44 is bored from the bottom of entrance 42 to the outer part 46 of cylinder 41. An helical groove 62 is made from the output of hole 44 to the other end 48 of the cylinder. Cylinder 41 is then fitted inside an outer shell 50 and is fixed thereto by a stem 52, preferably made of platinum. During the fusion process, a small portion of the semi-conducting glass flows between the inner cylinder and the outer shell soldering both parts together. The outer shell 50 is provided with a ring 54 which serves as a fixation collar when the multiplier is used as a detector in other apparatus and as a stop when the multiplier is in the forming device (as described hereinbelow) and subject to the application of gas pressure. Grooves 56 and 58 are similar to grooves 26 and 28 as described above with respect to the first embodiment of the invention. Typical dimensions of the present embodiment are: 2.4 cm length and 1.9 cm overall diameter. The semi-conducting glass layer 60 is deposited inside the cone 42, the channel 44, the helical passage 62 and the output 48. A metallic film is deposited at the input to electrically connect the semi-conducting layer 64 to the groove 56 and the exit 48 to the groove 58.

In FIG. 3, another embodiment of an electron multiplier device made in accordance with the present invention is shown at 70. A parallelepipedic piece of ceramic 72 includes an S-shaped groove 74 molded, or machined by pentographic methods, on the largest face of piece 72; typical dimensions of element 72 are 1.8 cm×1.6 cm×4 mm. A half-cone configuration 76 is machined in piece 72 to form the entrance of the electron multiplier. Another piece (not shown), which is a mirror image of piece 72, is machined with a groove and half-cone entrance which will fit exactly over the channel 74 and the half cone 76. Platinum stems may be inserted in alignment holes 78,79,80 and 81, thus making a semi-conducting glass-ceramic continuous dynode electron multiplier of the sandwich-type in which the section of the dynode may be circular, elliptical or otherwise shaped. The stems selected must match the coefficient of expansion of the ceramic and the glass. Shoulder 82 serves the same function as shoulder 30 and ring 54 in FIGS. 1 and 2, respectively. Grooves 84,86 serve the same function as grooves 26 and 28, and grooves 56 and 58 of FIGS. 1 and 2, respectively. The semi-conducting surface 88 is formed of the glass layer 90 with a soldering zone at 92. Metallic films 94,96 are provided for electrical contacts and are deposited between the cone entrance and groove 84 and between the exit 98 and groove 86.

FIG. 4 is a schematic illustration of a semi-conducting glass ceramic continuous dynode electron multiplier forming device 100. It is constituted by a tubular member 102 which can be rotated about its axis 104 and is orientable at a variable angle. The tubular member 102 is closed around a ceramic frame 106 by a ring 108 of refractory and gas-tight material. A cover 110 which retains the ring 108 prevents the frame 106 from sliding out of the tubular member 102 when air pressure is applied in chamber 112. The semi-conducting glass 114, which is first melted in the cone-shaped entrance 116 at the appropriate temperature, is forced in channel 118 by the pressure difference existing between chamber 112 and a second chamber 120 delimited by a cap member 122, the latter serving to control the gas flow and composition in the areas 112,118 and 120.

Although the invention has been described above with respect to specific forms of realization, it is evident that it may be refined and modified in various ways. For example, a series of these devices may be connected in a parallel arrangement and stacked to form an electron multiplier device to obtain superior effects. Therefore, it is wished to have it understood that the present invention should not be limited in scope except by the terms of the following claims.

The embodiments of the invention in which the exclusive property or privilege is claimed are defined as follows:

1. A method of making an electron multiplier device, comprising the steps of:
   pouring molten semi-conducting glass into at least one channel in a ceramic support having a higher fusion point than that of said glass and having the same coefficient of expansion;
   flowing the glass under gas pressure through said channel; and
   cooling said support and channel before removing the gas pressure to leave a semi-conducting wall to said channel.

2. A method as in claim 1, including the further step of flowing a reducing gas through said channel after cooling to produce a semi-conductive and emissive film on the glass.

3. A method as in claim 1, wherein said step of pouring includes pouring a molten glass formed from a mixture of oxides.

* * * * *